United States Patent

McIlroy et al.

[11] Patent Number: 6,077,490
[45] Date of Patent: Jun. 20, 2000

[54] METHOD AND APPARATUS FOR FILTERING HOT SYNGAS

[75] Inventors: Robert A. McIlroy, Marlboro Township, Stark County; Mark A. Perna, Lexington Township; Kurt E. Kneidel, Stark County; Andrew F. Kisik, Knox Township, Columbiana County, all of Ohio

[73] Assignee: McDermott Technology, Inc., New Orleans, La.

[21] Appl. No.: 09/271,741

[22] Filed: Mar. 18, 1999

[51] Int. Cl.⁷ ............................. B01D 39/20; B01D 41/04
[52] U.S. Cl. ......................... 423/215.5; 55/301; 55/302; 55/523; 55/DIG. 30
[58] Field of Search ........................... 55/301, 302, 523, 55/DIG. 30; 423/215.5

[56] References Cited

U.S. PATENT DOCUMENTS

| | | | |
|---|---|---|---|
| 4,735,638 | 4/1988 | Ciliberti | 55/302 |
| 5,167,676 | 12/1992 | Nakaishi | 55/302 |
| 5,254,144 | 10/1993 | Provol | 55/302 |
| 5,433,771 | 7/1995 | Bachovchin | 55/523 |
| 5,540,896 | 7/1996 | Newby | 422/172 |

*Primary Examiner*—Tom Dunn
*Assistant Examiner*—Peter DiMauro
*Attorney, Agent, or Firm*—R. J. Edwards; Eric Marich; R. C. Baraona

[57] ABSTRACT

A method and apparatus for filtering oxidizable particles from hot synthesis gas or syngas uses a pair of candle filters each having an inlet side for receiving the hot unfiltered syngas to be filtered, and an outlet side for discharging hot filtered syngas. One housing contains both filters or a separate housing is provided for each filter. Each housing has an inlet for receiving hot unfiltered syngas and for supplying the hot unfiltered syngas to each of the filter inlet sides. Each housing also has an outlet for discharging hot filtered syngas from each of the filter outlet sides. Air is supplied to each housing for supplying combustion air alternately to each of the candle filters for burning oxidizable particles trapped on each respective filter to clean each filter while the other filter is filtering the hot unfiltered syngas. One or more switching valves are connected to the combustion air supplies for alternating the supply of combustion air between the candle filters.

11 Claims, 5 Drawing Sheets

METHOD AND APPARATUS FOR FILTERING HOT SYNGAS

The subject matter of the present invention was developed under a research contract with the U.S. Army Research Office, Contract No. DAAH04-94-C-0012. The government of the United States has certain rights in the invention.

FIELD AND BACKGROUND OF THE INVENTION

The present invention relates in general to the processing of synthesized gases, and in particular to a new and useful technique for filtering particles and in particular un-reacted carbon soot, from syngas which is rich in CO and hydrogen.

Partial oxidation (POx) is a method for converting hydrocarbon fuels into a hydrogen-rich gas, e.g. for use in a fuel cell. The synthesis gas, or syngas, produced by partial oxidation is a mixture of gases rich in CO and hydrogen. The partial oxidation process, however, does not achieve 100% conversion of the carbon in the fuel to gases. About 1 to 3% of the carbon remains as un-reacted "soot".

Other partial oxidation processes for making syngas, such as black liquor gasification and coal gasification, also produce soot. Soot is undesirable and can be removed using a suitable filter. However, the filter must be cleaned periodically to prevent plugging and high pressure drop across the filter.

In a POx reactor demonstration test, MTI (McDermott Technology, Inc.) successfully used a ceramic cross or thru wall flow filter. A high pressure (100 psig) nitrogen pulse had to be applied to clean the filter. The nitrogen system pulsed every 15 minutes. Using a larger filter and allowing a higher pressure drop would have lengthened the cycle time, however, commercial electric power plants in general, and mobile power plants in particular, are unlikely to have a source of high pressure nitrogen available.

A simple, reliable, self-contained system is needed for syngas filtering that enables periodic, on-line cleaning of the filters with minimal pressure drop and flow disruption.

SUMMARY OF THE INVENTION

An object of the present invention is to provide an apparatus and method which utilizes candle filters and which provides continuous usage by alternating cleaning cycles using combustion air for cleaning one filter by burning combustible particles on the filter surface, while the other filter is used to filter hot unfiltered syngas.

Accordingly an object of the present invention is to provide an apparatus for filtering oxidizable particles from hot syngas comprising: a pair of candle filters each having an inlet side for receiving the hot unfiltered syngas to be filtered, and an outlet side for discharging hot filtered syngas; housing means for containing the filters, the housing means having inlet means for receiving hot unfiltered syngas and for supplying the hot unfiltered syngas to each of the filter inlet sides, the housing means having outlet means for discharging hot filtered syngas from each of the filter outlet sides; combustion air supply means connected to the housing means for supplying combustion air alternately to each of the candle filters for burning oxidizable particles trapped on each respective filter to clean each filter while the other filter is filtering the hot unfiltered syngas; and switching means connected to the combustion air supply means for alternating the supply of combustion air between the candle filters.

A further object of the present invention is to provide a method for filtering oxidizable particles from hot syngas which utilizes a pair of candle filters with alternate cleaning of one filter, while the other is used for filtering.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

The present invention includes both method and apparatus for filtering hot syngas. The filter consists of two high-temperature, metallic, "candle filter" elements 10 and 20 installed in parallel housings 12 and 14 and used alternately. The filter is preferably made of iron aluminide to withstand high (>1200° F.) temperature.

Figure 1:
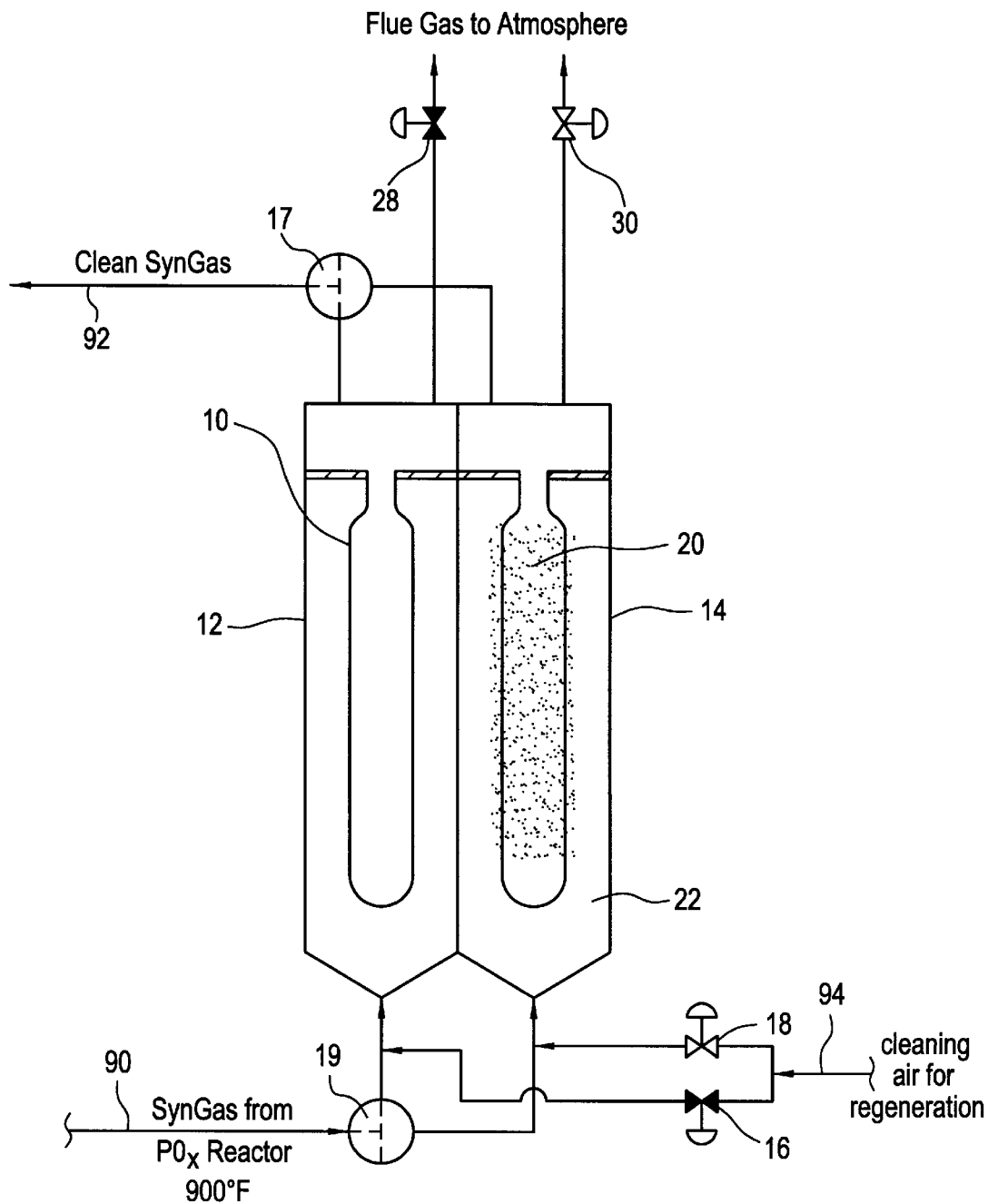
FIG. 1 is a schematic sectional view of one embodiment of the invention.
Figure 2:
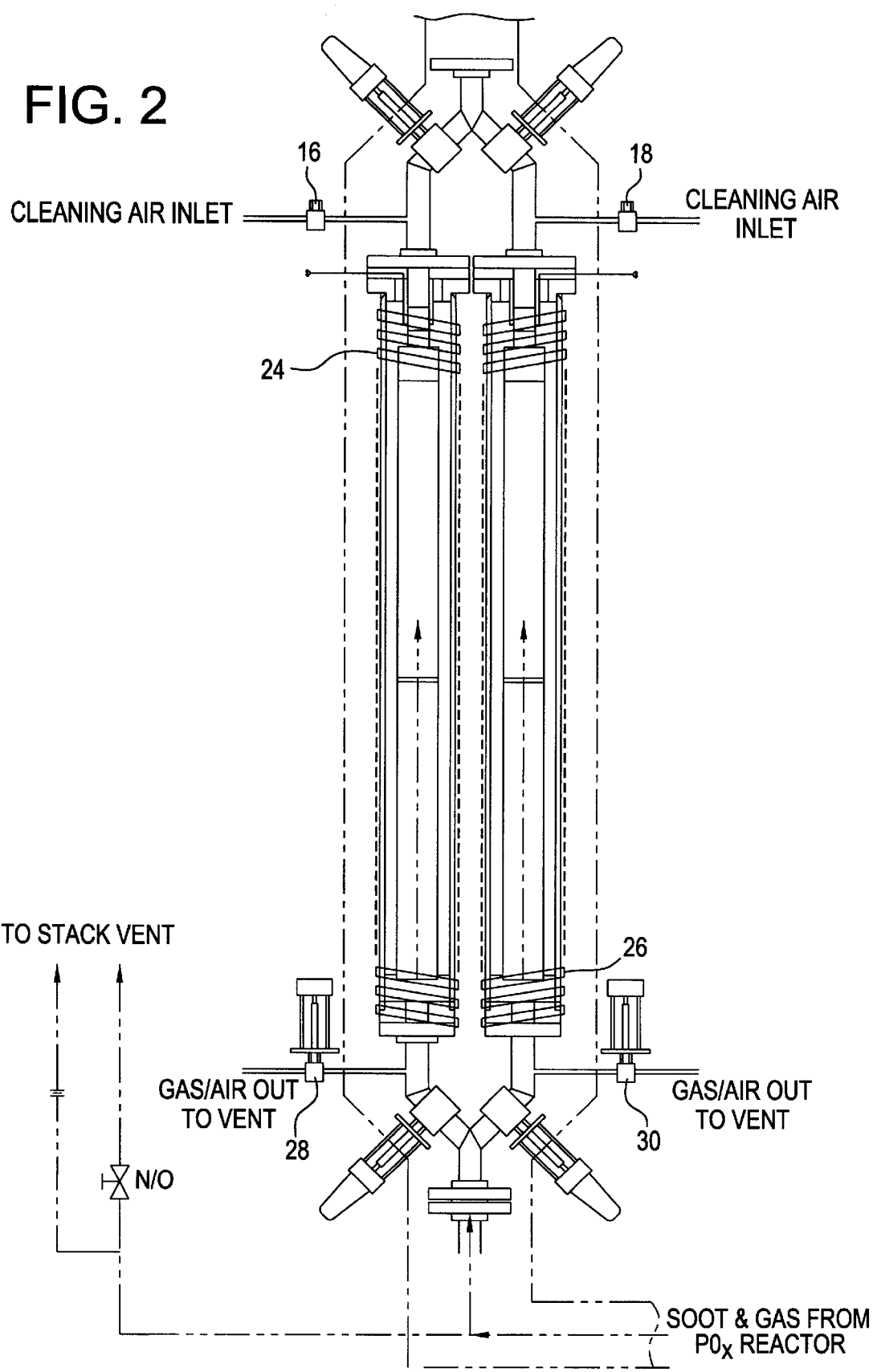
FIG. 2 is a view similar to FIG. 1 of a further embodiment of the invention.

One filter 10 cleans the syngas stream while the other filter 20 regenerates. The dirty filter is "regenerated" in situ by admitting a small flow of air to the inlet side 22 of the filter to burn off or oxidize the accumulated carbon as shown in FIG. 1. After a predetermined period of time, high temperature inlet valves or three way valves 17 and 19 redirect the gas flow from the dirty filter to the clean filter. The cycle time can be adjusted based on the allowable pressure drop across the filter element. The valve timing is controlled by a programmable logic controller (PLC). Heating elements or coils 24 and 26 shown in FIG. 2 around each housing (FIG. 2 is a sub-assembly drawing of the system), help maintain temperature to achieve complete combustion of the soot.

The flue gas produced by burning the carbon can be vented to the atmosphere through valves 28 and 30 in FIG. 1. Alternatively, the flue gas could be mixed with the syngas in a common exit plenum. While this second arrangement would eliminate all exit valves, the flue gas would dilute the syngas with inert gases, and would also consume some of the combustible gas if the flue gas contained excess oxygen.

Figure 3:
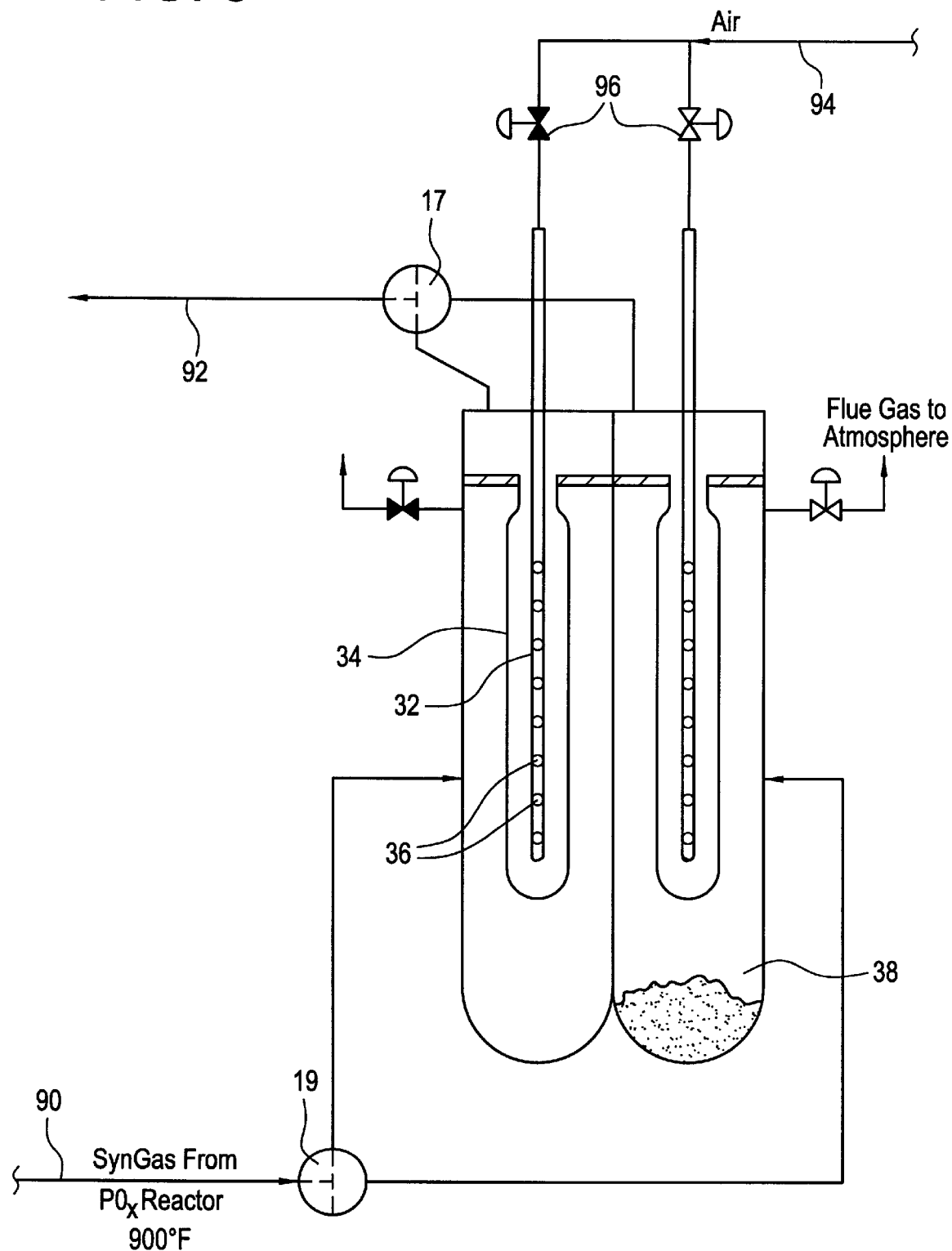
FIG. 3 is a view similar to FIG. 1 of a still further embodiment of the invention.

In another arrangement, the regeneration air is introduced in a direction opposite to the syngas, at the clean side of the filter, and is forced to flow through the filter element to the carbon layer as shown in FIG. 3. A tube 32 within the candle element 34 with several small holes 36 can be used to achieve better distribution of the air over the length of the candle. The flue gas is vented from the inlet side of the filter. By back flowing the air, it is anticipated that some of the carbon will be dislodged in a manner similar to a back pulsed filter. This material is burned in the bottom 38 of the filter housing.

Controlling the rate of combustion is a key element of the invention. The combustion rate must be slow enough that the candle element is not overheated and damaged by high temperature. The burning profile of the soot collected in a POx demonstration test showed minimal activity below about 480° C. (900° F.) at which temperature the soot ignited. Air is introduced across the filter during the entire regeneration period, so that the regeneration time well matches the filtration time. The air flow rate is quite low relative to the syngas flow, and is set to just match the quantity of air supplied in the regeneration period to the quantity of soot to be removed by oxidation. For example, in a test of the invention at a syngas flow rate of 54 lb/hr (corresponding to a thermal rating of 35 kw based on the gross (high) heating value of the incoming fuel) approximately 0.05 lb/hr of soot was deposited in the filter, and air was supplied at a rate of 5.9 lb/hr during the regeneration cycle. However it will be appreciated that if other power levels are required, the air flow rate would be adjusted up or down accordingly. There is no penalty for supplying excess air if the flue gas is vented.

The filter element is regenerated for further use without using auxiliary gases, e.g. an inert gas purge. There is no long-term accumulation of soot to be disposed of and a soot collection tank is not needed. The filter element is cleaned without any disassembly of the filter from the housing.

Figure 4:
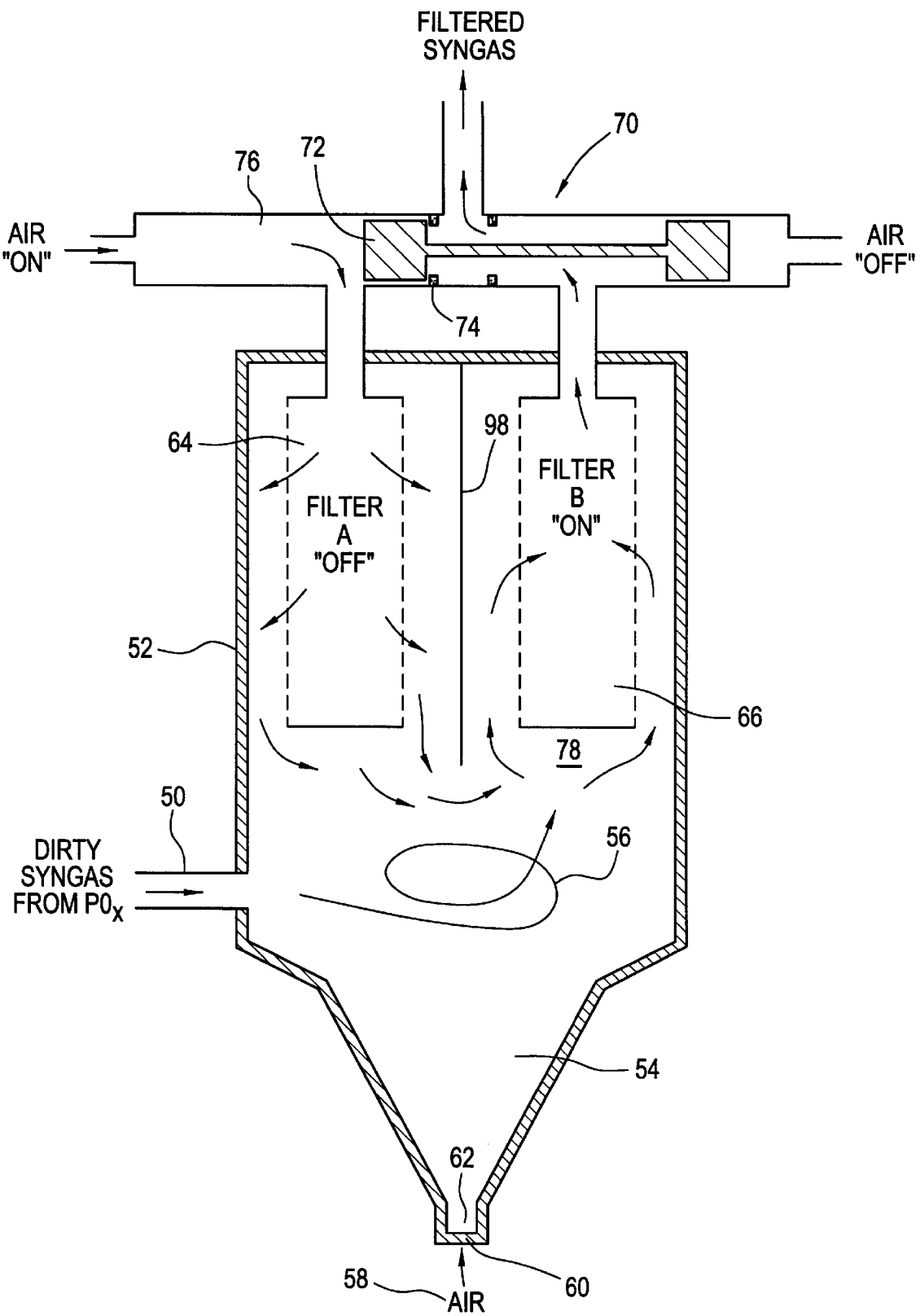
FIG. 4 is a view similar to FIG. 1 of a still further embodiment of the invention.

A second embodiment, described below and shown in FIG. 4, is less complex and more reliable since valves are not required upstream of the filter where the gas is still dirty. In addition, fewer valves in general are needed. Other unique features of this embodiment are the small amount of air introduced for cleaning is left in the syngas, eliminating any exhaust to atmosphere, a separator zone that reduces the duty on the filters is incorporated and a localized oxidizing zone is provided to eliminate the need for a large soot collection tank.

A second embodiment of the invention for filtering soot from syngas with periodic cleaning of the filter media is shown in FIG. 4. Dirty syngas flows at 50 into the bottom section of a "filtering vessel" 52. A 90° turn, or possibly a cyclonic flow pattern 56 in the "separator zone" could be used to separate any relatively large soot particles, which would fall to the bottom 54. A small amount of air 58 is introduced through a porous metal plate 60 at the bottom of the vessel. This creates a zone 62 with oxidizing conditions where soot would be burned, preferably generating as much carbon monoxide as possible.

FIG. 4 shows operation at a time when the left filter 64 is being cleaned while the right filter 66 is filtering. A relatively small amount of air (introduced into a spool valve cylinder 70 from the left) has caused the spool 72 to move to the rightmost position where it seals against a seat 74 in the cylinder 76. Air flows in reverse through the filter which causes the soot on the outside surface of the filter to burn, again generating as much carbon monoxide as possible. Any pieces of soot that dislodge from the filter fall into the oxidizing zone 62 at the bottom of the vessel. Combustion products join the main syngas stream 78. Meanwhile, the right filter 66 is filtering the syngas, building up a layer of soot on the outside surface. When pressure drop increases to a preset limit, the air input to the spool valve cylinder is switched from the left inlet to the right. The spool moves to the left and everything is reversed.

Figure 5:
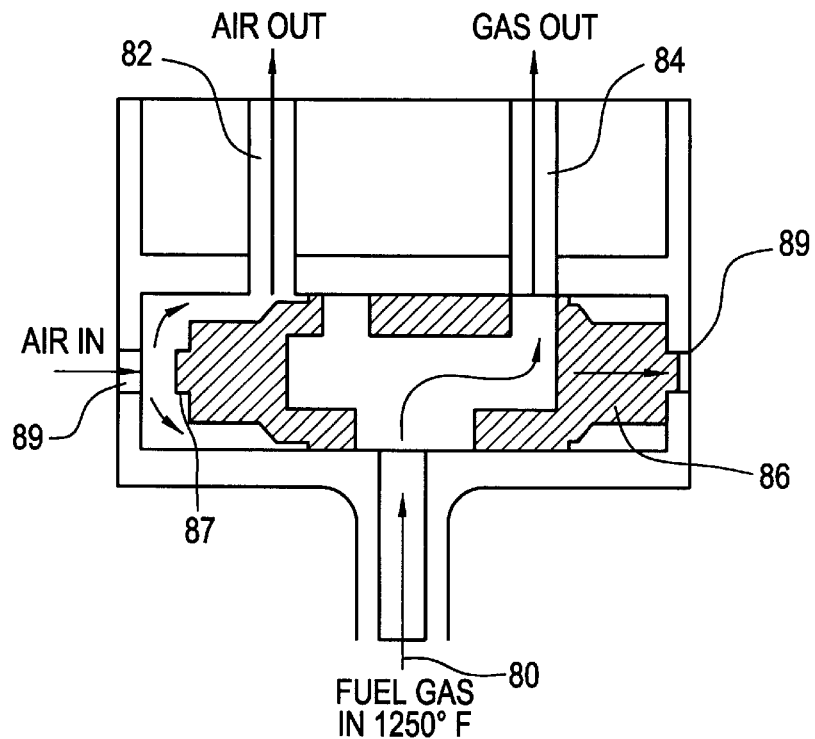
FIG. 5 is a schematic sectional view of a spool valve which can be used with the embodiment of FIG. 4.
Figure 6:
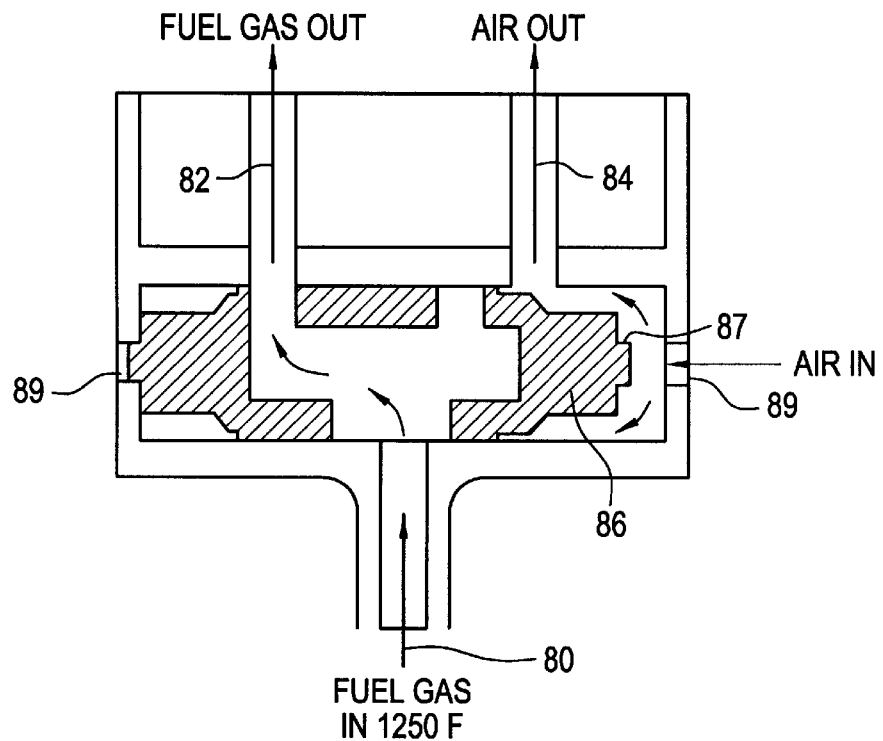
FIG. 6 is a view similar to FIG. 5 of the spool valve in a second position.

As show in FIGS. 5 and 6, the spool valve cylinder directs the flow of hot, hydrogen-rich fuel gases 80 at or above 1250° F. The spool valve must withstand high temperatures, and both oxidizing and reducing atmospheres as well as chemical reactions of the fuel gases. The outlet ports 82, 84 alternate between fuel and air delivery. The valve is made of ceramic materials such as silica/alumina or silicon carbide. The reciprocating motion of the internal spool 86 directs the flow of gases to the proper flow channel or port. The action of the spool is initiated by the air pressure. The spool acts like a piston when the air pushes against the spool's cross section. The air then enters the filter through the valve end 82 and is used as combustion air during the oxidation or cleaning of the filter, while the other port 84 directs the flow of the fuel gas. During operation, the ports alternate between air and fuel delivery functions.

A unique feature of the spool valve is the materials of construction. The spool valve performs the task that would require four costly and high maintenance valves. The spool valve components are simple and readily adaptable to commercial construction methods. The spool valve requires little or no maintenance and is easily replaceable. The spool valve would contribute to overall system efficiency since less energy is required for operation.

Temperature ramp up time is an important criteria for the spool valve's service. The rate of temperature increase and decrease must avoid thermal shock, which could cause failure of the ceramic components.

Returning to FIG. 1, the high temperature valve 19 provides unfiltered hot syngas along line 90 which is supplied either to the first or the second housing 12, 14 for filtering the oxidizable particles, that is the soot, on the outer surface or inlet side of a respective candle filter 10 or 20. The clean syngas is then supplied through a second three way valve 17 and to an outlet line 92. The candle filter which is not being used for filtration is supplied with combustion air on an air inlet line 94 and through one of the inlet valves 16 or 18 which is open. The combustion air on the hot outer surface of the candle filter converts the soot to gas which is then supplied through a respective open outlet valve 28, 30, to the atmosphere.

In FIG. 2, the outer coil heaters 24 and 26 maintain combustion temperatures for the candle filters inside the respective housings.

In FIG. 3 combustion air is supplied through one of the two valves 96 from an inlet line for air at 94 and into the interior perforated tube 32. In all the figures, the same numerals are utilized to represent the same or functionally similar parts, so that the functioning of these similar parts will not be repeated.

FIG. 4 illustrates an embodiment which is different from those of FIGS. 1–3 in that a single housing 52 houses both filters which are maintained in separate compartments, separated by a partition 98. Combustion air is supplied both at the bottom 58 and at each side of the spool valve cylinder 76 in the manner described previously.

In FIG. 5, spool 86 has opposite cylindrical projections 87 which alternately close the left and right air inlets 89 to channel the air at one side of the valve housing, while combustion gas is being channeled at the other side of the valve.

While a specific embodiment of the invention has been shown and described in detail to illustrate the application of the principles of the invention, it will be understood that the invention may be embodied otherwise without departing from such principles.

We claim:

1. An apparatus for filtering oxidizable particles from hot syngas comprising:

a pair of candle filters each having an inlet side for receiving the hot unfiltered syngas to be filtered, and an outlet side for discharging hot filtered syngas;

housing means for containing the filters, the housing means having inlet means for receiving hot unfiltered syngas and for supplying the hot unfiltered syngas to each of the filter inlet sides, the housing means having outlet means for discharging hot filtered syngas from each of the filter outlet sides;

combustion air supply means connected to the housing means for supplying combustion air alternately to each of the candle filters for burning oxidizable particles trapped on each respective filter to clean each filter while the other filter is filtering the hot unfiltered syngas; and switching means connected to the combustion air supply means for alternating the supply of combustion air between the candle filters.

2. The apparatus according to claim 1, wherein the housing means comprises a separate housing for each candle filter, the combustion supply means being connected to the inlet means of each housing for supplying combustion air over the same path that the hot unfiltered syngas is supplied, the switching means comprising valves in a combustion supply means and at least one syngas supply valve, the syngas supply valve and the valves in the combustion supply means being alternately operable so that while one housing receives hot unfiltered syngas, the other housing receives combustion air.

3. The apparatus according to claim 1, wherein the housing means comprises a separate housing for each candle filter, the combustion air supply means being connected to the outlet sides of the candle filters for supplying combustion air alternately to each outlet side of the candle filters to oxidize some of the trapped oxidizable particles and to propel some of the trapped oxidizable particles from the filter and to the bottom of the respective housing.

4. The apparatus according to claim 3, wherein the combustion air supply means includes a perforated tube extending into each candle filter for distributing combustion air throughout the outlet side of each candle filter.

5. The apparatus according to claim 1, including heating means connected to housing for maintaining the housing at a selected temperature high enough to oxidize particles with the combustion air.

6. The apparatus according to claim 1, wherein the housing means comprises a single housing containing separate chambers for each of the candle filters, the switching means comprising a spool valve connected to the outlet sides of the candle filters, the combustion air supply means comprising air inlets on each side spool valve each for supplying air to one of the candle filters, while the other candle filter receives hot unfiltered syngas and a flow of a product of combustion from oxidizing of filters trapped on the other filter, the spool valve including a spool for switching a supply of combustion air from one filter to the other filter.

7. The apparatus according to claim 6, wherein the housing means includes a lower inlet for additional combustion gas, a space near the bottom of the housing means forming an oxidizing chamber for oxidizing particles from the filter whose trapped particles are being oxidized.

8. The apparatus according to claim 6, wherein the spool valve is made of ceramic material.

9. A method for filtering oxidizable particles from hot syngas comprising:

passing hot unfiltered syngas alternately into an inlet side of each of a pair of candle filters, each filter having an outlet side for discharging hot filtered syngas; and passing combustion air alternately to each of the candle filters for burning oxidizable particles trapped on each respective filter during a previous passage of hot unfiltered syngas for cleaning each filter while the other filter is being used for filtering the syngas.

10. The method according to claim 9, including positioning the candle filters in separate housings and supplying combustion air to one of the housings while unfiltered hot syngas is supplied to the other housing.

11. The method according to claim 9, including positioning both filters in one housing and supplying combustion air through one filter while syngas and combustion products from the one filter are supplied to the second filter.

* * * * *